US012770947B2

(12) United States Patent
Xiao et al.

(10) Patent No.: US 12,770,947 B2
(45) Date of Patent: Oct. 20, 2026

(54) BATTERY ASSEMBLY AND METHOD THEREFOR

(71) Applicant: GM GLOBAL TECHNOLOGY OPERATIONS LLC, Detroit, MI (US)

(72) Inventors: Xingcheng Xiao, Troy, MI (US); William Reginald Collin, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 608 days.

(21) Appl. No.: 18/363,115

(22) Filed: Aug. 1, 2023

(65) Prior Publication Data

US 2025/0046895 A1 Feb. 6, 2025

(51) Int. Cl.
*H01M 10/52* (2006.01)
*H01M 50/403* (2021.01)

(52) U.S. Cl.
CPC ....... *H01M 10/523* (2013.01); *H01M 50/403* (2021.01)

(58) Field of Classification Search
CPC .................................................. H01M 10/523
See application file for complete search history.

(56) References Cited

U.S. PATENT DOCUMENTS

2020/0220234 A1* 7/2020 Dadheech ........... H01M 10/523

FOREIGN PATENT DOCUMENTS

CN 115810865 A 3/2023
DE 102019134104 A1 7/2020

OTHER PUBLICATIONS

Leng, Zeng, Yang, Li, Vattikuti, Chen, Li, Shim, Guo, Ko; Bimetallic Ni—Co MOF@PAN modified electrospun separator enhances high-performance lithium-sulfur batteries; Journal of Energy Chemistry 82; Mar. 2002; 484-496.

Zhang, Wang, Shao, Xiong, Liu, Lao, Xi, Lu, Jiang, Yu, Li, Yang, Kumar; Recyclable cobalt-molybdenum bimetallic carbide modified separator boosts the polysulfide adsorptioncatalysis of lithium sulfur battery; Science China Materials; 2020; 2443-2455.

Zhou, Zhang, Zou, Gu, Cai, Hong; MOF-Derived Bimetal ZnPd Alloy as a Separator Coating with Fast Catalysis of Lithium Polysulfides for Li—S Batteries; Applied Energy Materials; 2021; 13183-13190.

* cited by examiner

*Primary Examiner* — Brian R Ohara
(74) *Attorney, Agent, or Firm* — Quinn IP Law

(57) ABSTRACT

A battery cell having an anode and a cathode with a catalyzed separator interposed therebetween, and sealed within a cell case is described. The catalyzed separator is a substrate having a catalyzed coating arranged thereon. The catalyzed coating includes a bimetallic catalyst arranged on a support material. The bimetallic catalyst includes rhodium or ruthenium and a second transition metal. Lithium in zeolite functions as a catalyst promoter to accelerate a hydroformylation reaction.

18 Claims, 3 Drawing Sheets

BATTERY ASSEMBLY AND METHOD THEREFOR

INTRODUCTION

The concepts described herein relate to arrangements of battery cells and battery assemblies.

Lithium ion battery cells are susceptible to chemical and mechanical degradation, resulting in the generation of a significant amount of gas due to undesirable side reactions. These gases primarily include hydrogen, methane, ethylene, carbon monoxide and other hydrocarbon species, all of which are flammable. The build-up of these gases may cause the cell to swell, adversely affecting the diffusion of lithium ions in the electrolyte. Moreover, it poses concerns such as potential battery cell rupture, liquid electrolyte leakage, and risk of a thermal event, all of which may reduce service life of a battery cell.

SUMMARY

The concepts herein provide, in one embodiment, a battery cell having an anode and a cathode with a catalyzed separator interposed therebetween, and sealed within a cell case.

The concepts herein provide, in one embodiment, a battery cell having multiple anodes and cathodes and one or multiple catalyzed separators, all sealed within a cell case.

The catalyzed separator is a planar substrate having a catalyzed coating arranged thereon. The catalyzed coating includes a bimetallic catalyst arranged on a support material. The bimetallic catalyst includes rhodium or ruthenium and a second transition metal.

The catalyzed separator functions to convert combustible gases that may be formed within a battery cell into liquid through a hydroformylation process in the electrochemical environment of the battery cell. This may operate to suppress gas build up within a battery cell. A transition metal, e.g., rhodium or ruthenium, forms a bimetallic catalyst, with second transition metal ions dissolved from the cathode into the electrolyte, and the lithium in zeolite functions as a catalyst promoter to accelerate the hydroformylation reaction. The formed aldehyde may be preferentially trapped in zeolite pores of the catalyzed separator and therefore avoid the damage to liquid electrolyte.

An aspect of the disclosure may include a battery cell that includes a catalyzed separator interposed between an anode and a cathode. The catalyzed separator has a catalyzed coating arranged on a planar substrate. The catalyzed coating includes a bimetallic catalyst that is arranged on a support material.

Another aspect of the disclosure may include the coating arranged on the substrate having a thickness that is between 300 nanometers and 10 microns.

Another aspect of the disclosure may include the catalyst being rhodium.

Another aspect of the disclosure may include the catalyst being ruthenium.

Another aspect of the disclosure may include the catalyst being one of nickel, cobalt, manganese, zinc, copper, or iron.

Another aspect of the disclosure may include the catalyst being one of platinum or palladium.

Another aspect of the disclosure may include the support material being one of lithium-zeolite, zeolite, metal-organic framework, alumina (Al2O3), silica (SiO2), titania, boehmite, or magnesium oxide (MgO).

Another aspect of the disclosure may include the catalyzed coating being arranged on only one side of the planar substrate.

Another aspect of the disclosure may include the catalyzed coating being arranged on both sides of the planar substrate.

Another aspect of the disclosure may include the battery cell being a plurality of anodes and a plurality of cathodes arranged in a stack and a plurality of the catalyzed separators, including a first catalyzed separator and a second catalyzed separator. The first catalyzed separator is disposed on a first end of the stack and the second catalyzed separator is disposed on a second end of the stack.

Another aspect of the disclosure may include a catalyzed separator for a battery cell having a catalyzed coating arranged on a substrate, with the catalyzed coating including a catalyst arranged on a support material.

Another aspect of the disclosure may include the catalyst being rhodium, ruthenium, nickel, cobalt, manganese, zinc, copper, iron, platinum, palladium, or a combination thereof.

Another aspect of the disclosure may include the substrate of the catalyzed separator being fabricated from one of a polyaramid material, a polyethylene material, or a polypropylene material.

Another aspect of the disclosure may include a method for forming a separator for a battery cell that includes preparing a solvent including a lithiated zeolite and a catalytic material containing a salt; executing a solid-state ion exchange on the solvent; and applying the solvent onto a surface of a substrate.

Another aspect of the disclosure may include reducing particle size of the solvent prior to applying the solvent.

The above features and advantages, and other features and advantages, of the present teachings are readily apparent from the following detailed description of some of the modes for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various features of the present disclosure as disclosed herein, including, for example, specific dimensions, orientations, locations, and shapes. Details associated with such features may be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments may be practiced without some of these details. Moreover, for the purpose of clarity, certain technical material that is understood in the related art has not been described in detail to avoid unnecessarily obscuring the disclosure. Furthermore, the drawings are in simplified form and are not to precise scale. For purposes of convenience and clarity, directional terms such as top, bottom, left, right, up, over, above, below, beneath, rear, and front, may be employed to assist in describing the drawings. These and similar directional terms are illustrative, and are not to be construed to limit the scope of the disclosure. Furthermore, the disclosure, as illustrated and described herein, may be practiced in the absence of an element that is not specifically disclosed herein.

Figure 1:
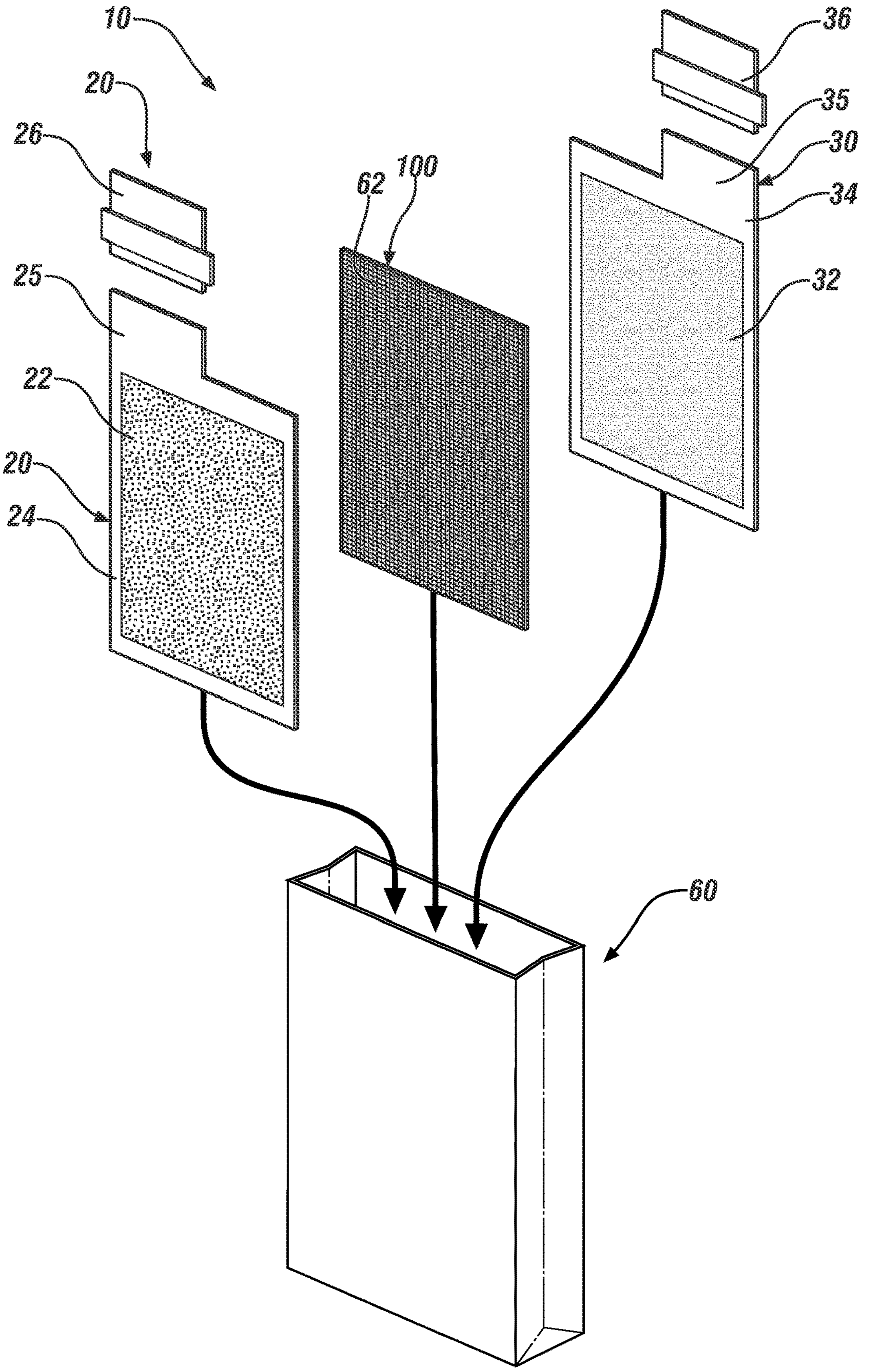
FIG. 1 schematically shows an exploded isometric view of a battery cell that includes an anode, a cathode, and a catalyzed separator that are arranged in a stack, in accordance with the disclosure.

Referring to the drawings, wherein like reference numerals correspond to like or similar components throughout the several Figures, FIG. 1 schematically illustrates an embodiment of a prismatically-shaped lithium-ion battery cell 10 that includes an anode 20, a catalyzed separator 100, and a cathode 30, which are arranged in a stack and sealed in a flexible pouch 60 containing an electrolytic material 62.

The anode 20, catalyzed separator 100, and cathode 30 are configured with planar shapes having the same or similar surface areas.

A first, negative battery cell tab 26 and a second, positive battery cell tab 36 protrude from the flexible pouch 60. The terms "anode" and "negative electrode" are used interchangeably. The terms "cathode" and "positive electrode" are used interchangeably. A single arrangement of the anode 20, catalyzed separator 100, and cathode 30 is illustrated. It is appreciated that multiple arrangements of the anode 20, catalyzed separator 100, and cathode 30 may be arranged and electrically connected in the flexible pouch 60, depending upon the specific application of the battery cell 10.

Alternatively, the lithium-ion battery cell 10 including anode 20, catalyzed separator 100, cathode 30, and electrolytic material 62 are arranged in a stack and sealed in a rigid walled cell case.

Alternatively, the lithium-ion battery cell 10 including anode 20, catalyzed separator 100, cathode 30, and electrolytic material 62 are arranged in a stack and sealably formed in a cylindrical cell case.

The anode 20 includes a first active material 22 that is arranged on an anode current collector 24. The anode current collector 24 is a metallic substrate with a foil portion 25 that extends from the first active material 22 to form the first battery cell tab 26. In one embodiment, the anode current collector 24 is fabricated from copper, copper alloy, stainless steel, nickel, etc., or another material that does not alloy with lithium.

The cathode 30 includes a second active material 32 that is arranged on a cathode current collector 34. The cathode current collector 34 is a metallic substrate with a foil portion 35 that extends from the second active material 32 to form the second battery cell tab 36. In one embodiment, the cathode current collector 34 is fabricated from aluminum or an aluminum alloy.

The anode and cathode current collectors 24, 34 are thin metallic plate-shaped elements that contact their respective first and second active materials over an appreciable interfacial surface area. The purpose of the anode and cathode current collectors 24, 34 is to exchange free electrons with their respective first and second active materials during electrochemical discharging and charging events.

The catalyzed separator 100 is arranged between the positive electrode 30 and the negative electrode 20 to physically separate and electrically isolate the positive electrode 30 from the negative electrode 20. Additional details related to the catalyzed separator are described with reference to FIGS. 2, et seq.

The electrolytic material 62 that conducts lithium ions is contained within the catalyzed separator 100 and is exposed to each of the positive and negative electrodes 30, 20 to permit lithium ions to move between the positive and negative electrodes 30, 20. Lithium ions de-intercalated from the negative electrode 20 during discharge or from the positive electrode 30 during charge give up electrons that flow through the current collectors 24 and 34, respectively, through an external circuit connected either to a load or a charger, and then to the opposite current collectors (34 and 24) and electrodes (30 and 20) where they reduce lithium ions as they are being intercalated.

The negative electrode 20 and the positive electrode 30 are fabricated as electrode materials that are able to intercalate and deintercalate lithium ions. The electrode materials of the positive and negative electrodes 30, 20 are formulated to store intercalated lithium at different electrochemical potentials relative to a common reference electrode, e.g., lithium. In the construct of the electrode pair 20, the negative electrode 20 stores intercalated lithium at a lower electrochemical potential (i.e., a higher energy state) than the positive electrode 30 such that an electrochemical potential difference exists between the positive and negative electrodes 30, 20 when the negative electrode 20 is lithiated. The electrochemical potential difference for each battery cell 10 results in a charging voltage in the range of 3V to 5V and nominal open circuit voltage in the range of 2.9V to 4.2V. These attributes of the negative and positive electrodes 30, 20 permit the reversible transfer of lithium ions between the positive and negative electrodes 30, 20 either spontaneously (discharge phase) or through the application of an external voltage (charge phase) during operational cycling of the electrode pair 20. The thickness of each positive and negative electrode 30, 20 ranges between 30 microns (μm) and 150 μm.

The negative electrode 20 has anodic material in the form of a lithium host material such as, for example, graphite, silicon, or lithium titanate. The lithium host material may be intermingled with a polymeric binder material to provide the negative electrode 20 with structural integrity and, in one embodiment, a conductive fine particle diluent. The lithium host material is preferably graphite and the polymeric binder material is preferably one or more of polyvinylidene fluoride (PVdF), an ethylene propylene diene monomer (EPDM) rubber, styrene butadiene rubber (SBR), a carboxymethyl cellulose (CMC), polyacrylic acid, or mixtures thereof. Graphite is normally used to make the negative electrode 20 because, in addition to being relatively inert, its layered structure exhibits favorable lithium intercalation and deintercalation characteristics that help provide the battery electrode pair 20 with a desired energy density. Various forms of graphite that may be used to construct the negative electrode 20 are commercially available. The conductive diluent may be fine particles of, for example, high-surface area carbon black.

The positive electrode 30 has cathodic material in the form of a lithium-based active material that stores intercalated lithium at a higher electrochemical potential (relative to a common reference electrode) than the anodic material of lithium host material used to make the negative electrode 20. The same polymeric binder materials (PVdF, EPDM, SBR, CMC, polyacrylic acid) and conductive fine particle diluent (high-surface area carbon black) that may be used to construct the negative electrode 20 may also be intermingled with the lithium-based active material of the positive electrode 30 for the same purposes. The lithium-based active material is preferably a layered lithium transition metal oxide, such as lithium cobalt oxide, a spinel lithium transition metal oxide, such as spinel lithium manganese oxide, a lithium polyanion, such as a nickel-manganese-cobalt oxide, lithium iron phosphate, or lithium fluorophosphate. Some other suitable lithium-based active materials that may be employed as the lithium-based active material include lithium nickel oxide, lithium aluminum manganese oxide, and lithium vanadium oxide, to name examples of alternatives. Mixtures that include one or more of these recited lithium-based active materials may also be used to make the positive electrode 30.

Figure 2:
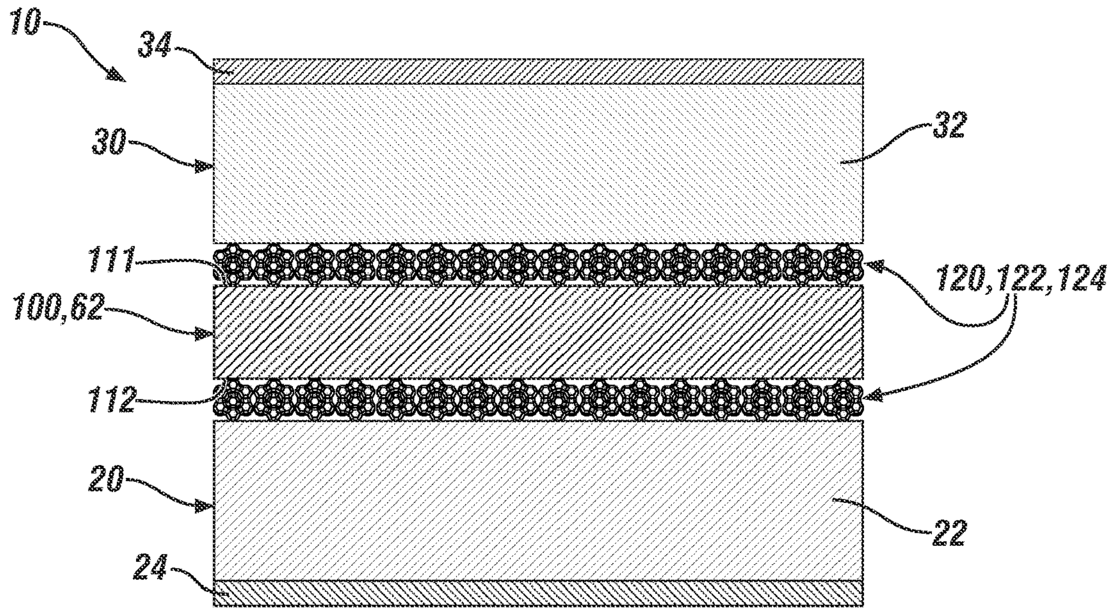
FIG. 2 schematically illustrates a partial cutaway sideview of an embodiment of a battery cell including a catalyzed separator, in accordance with the disclosure.

Referring now to FIG. 2 with continued reference to FIG. 1, a portion of the lithium-ion battery cell 10 is illustrated and includes anode 20, catalyzed separator 100 including catalyzed coating 120, and cathode 30, arranged in a stack. In this embodiment the catalyzed separator 100 has the catalyzed coating 120 arranged on both surfaces of substrate 110.

The cathode 30 includes cathodic material 32 that is arranged on a first current collector 34, wherein the cathodic material 32 adjoins a first surface 111 of the catalyzed separator 100. The anode 20 includes anodic material 22 that is arranged on a second current collector 24, wherein the anodic material 22 adjoins a second surface 112 of the catalyzed separator 100.

The catalyzed separator 100 includes a substrate 110 arranged as a planar sheet having first surface 111 and second surface 112, wherein a catalyzed coating 120 is joined via spraying, dipping, or another process to either or both the first surface 111 and the second surface 112. In one embodiment, and as shown, the catalyzed coating 120 is joined to both the first surface 111 and the second surface 112. Alternatively, the catalyzed coating 120 is joined to only the first surface 111, and the second surface 112 is uncoated. Alternatively, the catalyzed coating 120 is joined to only the second surface 112, and the first surface 111 is uncoated. The catalyzed coating 120 includes a bimetallic catalyst 122 that is arranged on a support material 124.

The substrate 110 is formed in a planar sheet and has one or more porous polymer layers (or a base film) that, individually, may be composed of any of a wide variety of polymers. One such polymer layer is shown here for simplicity. Each of the one or more polymer layers may be a polyolefin. Some specific examples of a polyolefin are polyethylene (PE) (along with variations such as HDPE, LDPE, LLDPE, and UHMWPE), polypropylene (PP), or a blend of PE and PP, polyaramid, polyimide, or polyamide. The polymer layer(s) function to electrically insulate and physically separate the anode 20 from the cathode 30.

The catalyzed coating 120 includes bimetallic catalyst 122 that is arranged on support material 124. The catalyzed coating 120 is deposited on and adhered to the substrate 110 at a thickness that is between 300 nanometers and 10 microns.

The bimetallic catalyst 122 may be arranged as a bimetallic catalyst that includes rhodium (Rh), ruthenium (Ru), zinc (Zn), or another catalytic material, and a second transition metal. The second transition metal may be one or more of nickel, cobalt, manganese, zinc, copper, iron, platinum, or palladium. Some of them, such as nickel, cobalt, or manganese, may be dissolved from the cathode.

The support material 124 may be composed as one or more of lithium-zeolite, zeolite, metal-organic framework, alumina (Al2O3), silica (SiO2), titania, boehmite, or magnesium oxide (MgO).

The catalyzed separator 100 with catalyzed coating 120 is advantageously arranged as a heterogeneous bimetallic catalyst that enables a hydroformylation reaction. The hydroformylation reaction includes the lithium in zeolite functioning as a catalyst promoter to accelerate the hydroformylation reaction. The hydroformylation reaction, also known as an oxo process, includes the addition of a hydrogen atom and a formyl group to the molecule of a compound containing a double bond by reaction with hydrogen and carbon monoxide, to form one or more aldehydes. The energy barrier for the catalytic reaction may be overcome by the electrochemical potential applied between the anode and cathode.

In the case of hydroformylation reaction within an embodiment of the battery cell 10 described herein, the aldehydes formed in situ may be adsorbed by the zeolite coating, thus suppressing gas build up within the cell. The trapped transition metal will combine ruthenium or rhodium to form a heterogeneous bimetallic catalyst, while the lithium in zeolite first and second as the catalyst promoter to accelerate the hydroformylation reaction. The formed aldehyde will be preferentially trapped to zeolite pores.

A non-limiting example of the hydroformylation reaction may be expressed as follows:

$$\text{H2C} = \text{CH2} + \text{CO} + \text{H2} \xrightarrow{\text{Rh}} \text{C2H5CHO}$$

The bimetallic catalyst of Rh (trace amount)+Second transition Metal such as Co, Ni, Mn, enables the hydroformylation reaction using heterogeneous bimetallic catalysts, which trap transition metal ions in a Li-zeolite separator.

Referring again to FIG. 1, with continued reference to FIG. 2, the battery cell 10 is a planar-shaped lithium ion battery cell 10 that is sealed in a flexible pouch containing an electrolytic material 62 in one embodiment, and as illustrated. Alternatively, the battery cell 10 is a planar-shaped lithium ion battery cell 10 that is contained in a sealed rigid case 60, e.g., a sealed rectangular prism that includes electrolytic material 62. In one embodiment, the electrolytic material 62 is a solid state material. The battery cell 10 may have had a rectangular shape, or a non-rectangular shape, or another configuration. In one embodiment, a reference electrode (not shown) may be arranged between the anode 20 and the cathode 30.

A single electrode pair including an arrangement of the anode 20, solid state catalyzed separator 100, and cathode 30 is illustrated for each of the battery cells 10. It is appreciated that multiple electrode pairs may be arranged and electrically connected in the sealed cell case 60, depending upon the specific application of the battery cell 10.

The anode 20 includes a first active material that is arranged on an anode current collector 24. The anode current collector 24 is a metallic substrate with a foil portion that extends from the first active material to form the anode tab 22.

The cathode 30 includes a second active material that is arranged on a cathode current collector 34, with the cathode current collector 34 having a foil portion that extends from the second active material to form the cathode tab 32.

The anode and cathode current collectors 24, 34 are thin metallic plate-shaped elements that contact their respective first and second active materials over an appreciable interfacial surface area. The purpose of the anode and cathode current collectors 24, 34 is to exchange free electrons with their respective first and second active materials during discharging and charging.

The anode current collector 24 is a flat, plate-shaped metallic substrate in the form of a rectangular planar sheet in one embodiment. The anode current collector 24 is fabricated from one of copper, copper alloy, stainless steel, nickel, etc., or another material that does not alloy with lithium. In one embodiment, the anode current collector 24 has a thickness at or near 0.02 mm. The first active material may be an indium nitride layer that is applied onto one or both surfaces of the anode current collector 24.

The cathode current collector 34 is a metallic substrate in the form of a planar sheet that is fabricated from aluminum or an aluminum alloy, and has a thickness at or near 0.02 mm in one embodiment. The solid state catalyzed separator 100 is arranged between the anode 20 and the cathode 30 to physically separate and electrically isolate the anode 20 from the cathode 30.

The electrolytic material 62 that conducts lithium ions is an element of the solid state catalyzed separator 100 and is exposed to each of the anode 20 and the cathode 30 to permit lithium ions to move between the anode 20 and the cathode 30. Lithium ions are stripped from the anode 20 during discharge, or from the cathode 30 during charge to give up electrons that flow through the current collectors 24, 34, respectively, through an external circuit connected either to a load or a charger, and then to the opposite current collectors (34, 24) and electrodes (30 and 20) where they reduce lithium ions as they are being intercalated or plated.

The anode 20 and the cathode 30 are each fabricated as electrode materials that are able to deposit and strip the lithium ions (on an anode), or intercalate and deintercalate (on a cathode). The electrode materials of the anode 20 and the cathode 30 are formulated to store lithium at different electrochemical potentials relative to a common reference electrode, e.g., lithium. The anode 20 stores deposited or plated lithium at a lower electrochemical potential (i.e., a higher energy state) than the cathode 30 such that an electrochemical potential difference exists between the anode 20 and the cathode 30 when the anode 20 is lithiated. The electrochemical potential difference for each battery cell 10 results in a charging voltage in the range of 3V to 5V and nominal open circuit voltage in the range of 2.9V to 4.2V. These attributes of the anode 20 and the cathode 30 permit the reversible transfer of lithium ions between the anode 20 and the cathode 30 either spontaneously (discharge phase) or through the application of an external voltage (charge phase) during operational cycling. The thickness of the anode 20 ranges between 10 microns (um) and 60 μm in one embodiment.

The solid state catalyzed separator 100 includes a solid polymer that includes electrolytic material 62, and may be composed of a variety of polymers that provide thermal stability. The polymer layer(s) functions to electrically insulate and physically separate the anode 20 and the cathode 30. The solid state catalyzed separator 100 may further be infiltrated with electrolytic material 62 throughout the porosity of the polymer layer(s). The electrolytic material 62 includes lithium in one embodiment. The solid state separator 100 has a thickness that may be between 10 microns (um) to 60 um.

Figure 3:
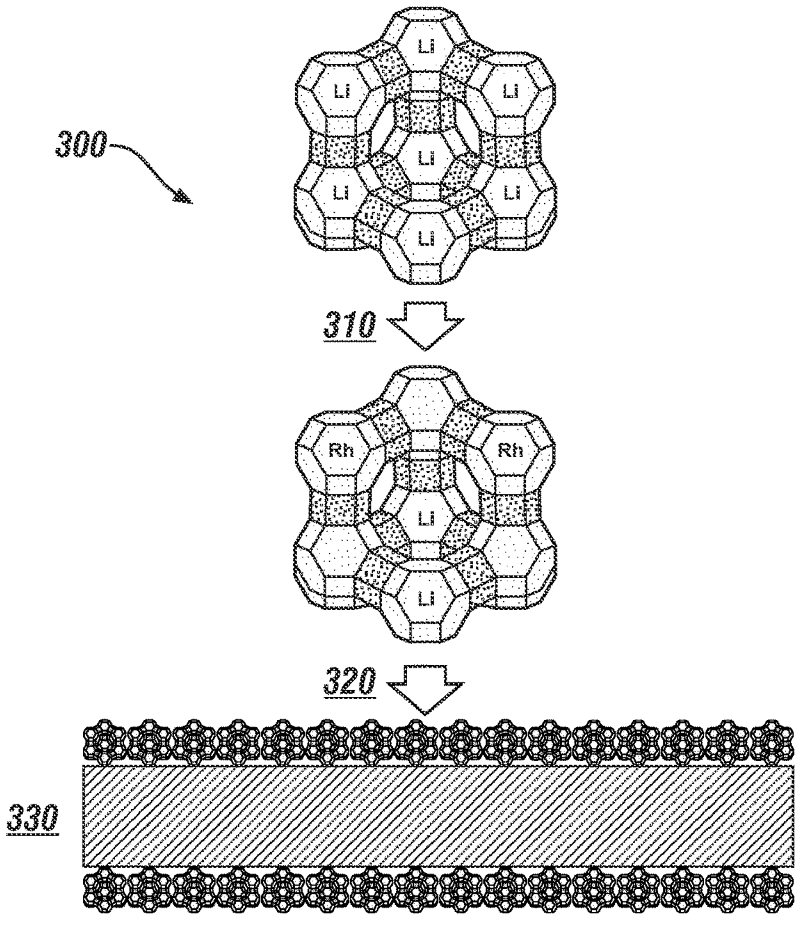
FIG. 3 pictorially illustrates a process for forming a catalyzed separator, in accordance with the disclosure.

FIG. 3 pictorially illustrates a process 300 for applying a catalyst onto a ceramic coated separator, such as lithiated zeolite, which first and second to convert the combustible gases into liquid through hydroformylation process under the electrochemical environment, and thus suppress gas built inside cells. A trapped second transition metal will combine with ruthenium or rhodium to form a bimetallic catalyst, while the lithium in zeolite will be used as the catalyst promoter to accelerate the hydroformylation reaction. The formed aldehyde will be preferentially trapped to zeolite pores, thus avoiding damaging the liquid electrolyte.

The process 300 starts with forming a lithiated zeolite (Step 310). A solid state ion exchange is executed to form a catalyzed lithiated zeolite (Step 320). The catalyzed lithiated zeolite is milled or otherwise processed to reduce particle size to submicron level, e.g., 300 nm, and a slurry coating is formed with the catalyzed lithiated zeolite being in suspension and applied onto a surface of the substrate (Step 330).

Catalyst preparation includes executing a solvent ion exchange between lithiated zeolite with catalyst containing salts such as $O_4PRh$, $O_8P_2Rh_3$, $RhCl_3$, $[Rh(NH_3)_5Cl]Cl_2$, and $Rh(ClO_4)_3$, etc., $RuCl_3$, $RuCl_3 \cdot xH_2O$, $[Ru(NH_3)_5Cl]Cl_2$, $Ru(NO)(NO_3)x(OH)_y$, and a salt such as Zn salt, Mo salt, Co salt, Palladium complex, etc. The solid-state ion exchange is achieved by mixing the lithiated zeolite with catalyst containing salts to form the catalyzed lithiated zeolite, and reducing particle size to submicron sizes, e.g., around 300 nm. The catalyzed lithiated zeolite is suspended in a solvent. The separator is coated using a slurry coating process or a dry spray process to join the catalyzed lithiated zeolite onto the surface of the substrate as a ceramic coating.

Figure 4:
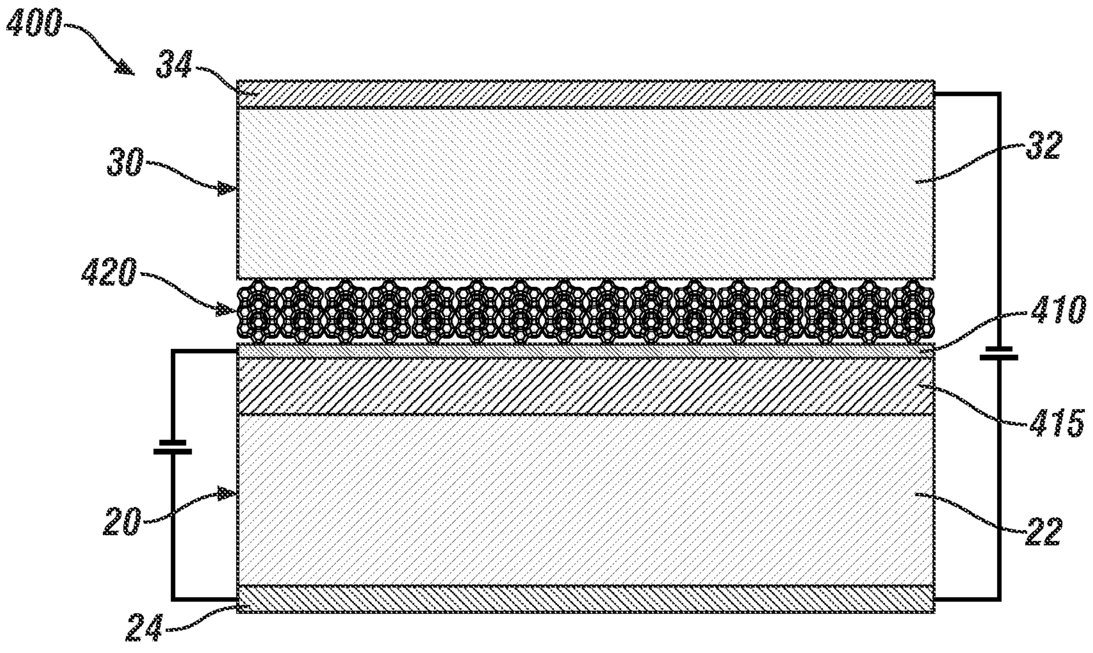
FIG. 4 schematically illustrates a partial cutaway sideview of another embodiment of a battery cell including a catalyzed separator, in accordance with the disclosure.

FIG. 4 schematically illustrates an embodiment of the lithium-ion battery cell 400 that includes anode 20, catalyzed separator 420 including a reference electrode 415, and cathode 30, which are arranged in a stack. In this embodiment, the catalyzed separator 400 includes substrate 410, reference electrode 415, and catalyzed coating 120, and the reference electrode 415 is interposed between the substrate 410 and the catalyzed coating 120. In this embodiment, the catalyzed coating 120 is adjacent to the cathodic material 32 of the cathode 30.

The cathode 30 includes cathodic material 32 that is arranged on first current collector 34. The anode 20 includes anodic material 22 that is arranged on a second current collector 24. The catalyzed separator 100 includes a substrate 110 arranged as a planar sheet having a first surface 111 and a second surface 112, wherein a catalyzed coating 120 is joined to either or both the first surface 111 and the second surface 112.

Figure 5:
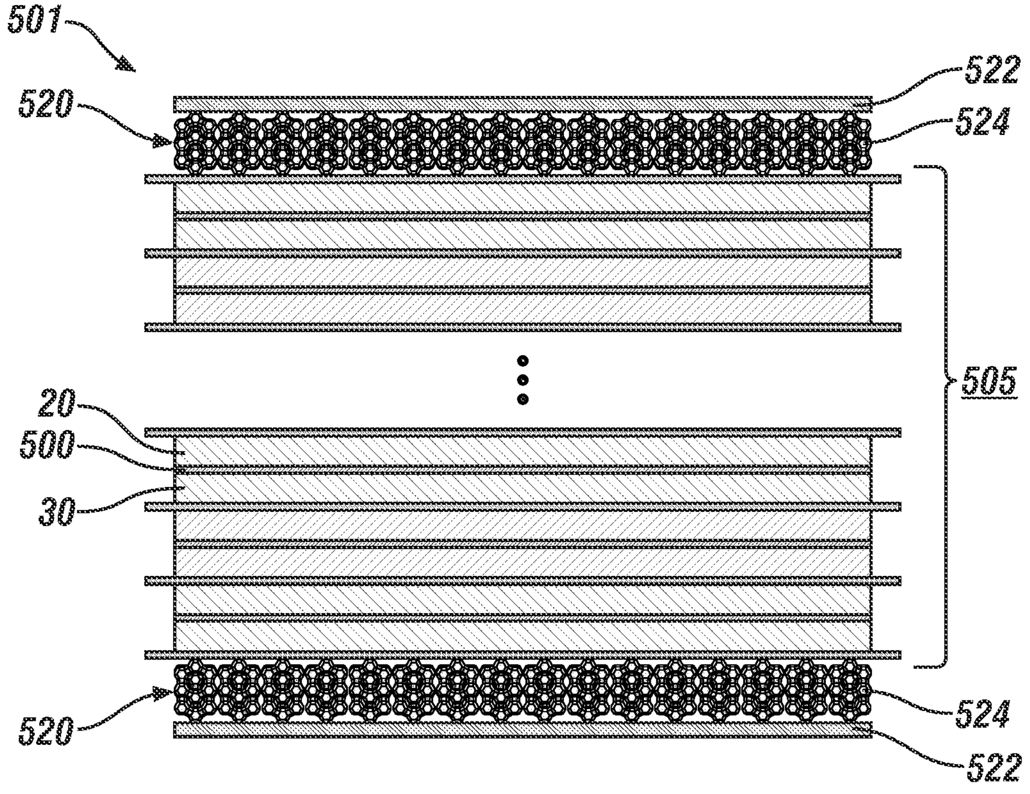
FIG. 5 schematically illustrates a partial cutaway sideview of another embodiment of a battery cell including a catalyzed separator, in accordance with the disclosure.

FIG. 5 schematically illustrates an embodiment of the lithium-ion battery cell 501 that includes a stack 505 that is composed of a plurality of anodes 20, separators 500, and cathodes 30, with a catalyzed separator 520 being disposed on a first side and a second side of the stack 505. Each of the catalyzed separators 500 includes substrate 522 and catalyzed coating 524.

The concepts described herein provide for process to apply catalysts on ceramic coated separator, such as lithiated zeolite, and convert combustible gases formed within the cell case into liquid through hydroformylation process under the electrochemical environment, therefore, to suppress the gas built inside cells and improve battery service life. A trapped second transition metal combines with the rhodium or ruthenium to form a bimetallic catalyst, and the lithium in zeolite will be used as the catalyst promoter to accelerate the hydroformylation reaction. The formed aldehyde will be preferentially trapped to zeolite pores, and therefore may avoid harm to the electrolyte.

The lithium in zeolite acts as a promoter along with the catalyst to synergistically facilitate the hydroformylation reaction. Reaction byproducts such as aldehyde and alcohol in-situ are adsorbed in zeolite coating. The combustible gases are converted in situ, therefore may suppress gas build up and cell swelling.

The detailed description and the drawings or figures are supportive and descriptive of the present teachings, but the scope of the present teachings is defined solely by the claims. While some of the embodiments for carrying out the present teachings have been described in detail, various alternative designs and embodiments exist for practicing the present teachings defined in the appended claims.

What is claimed is:

1. A battery cell, comprising:

a catalyzed separator interposed between an anode and a cathode;

the catalyzed separator including a catalyzed coating arranged on a planar substrate; and the catalyzed coating being a bimetallic catalyst that is arranged on a support material including lithium.

2. The battery cell of claim 1, wherein the bimetallic catalyst includes rhodium and a second transition metal.

3. The battery cell of claim 2, wherein the second transition metal comprises one of nickel, cobalt, manganese, zinc, copper, or iron.

4. The battery cell of claim 2, wherein the bimetallic catalyst is joined to the substrate via ion exchange.

5. The battery cell of claim 1, wherein the bimetallic catalyst includes ruthenium and a second transition metal, and wherein the second transition metal comprises one of nickel, cobalt, manganese, zinc, copper, or iron.

6. The battery cell of claim 1, wherein the coating arranged on the substrate has a thickness that is between 300 nanometers and 10 microns.

7. The battery cell of claim 1, wherein the support material comprises one of zeolite, a metal-organic framework (MOF), alumina (Al2O3), silica (SiO2), titania, boehmite, or magnesium oxide (MgO).

8. The battery cell of claim 1, wherein the catalyzed coating is arranged on only one side of the substrate.

9. The battery cell of claim 1, wherein the catalyzed coating is arranged on both sides of the substrate.

10. The battery cell of claim 1, wherein the battery cell comprises a plurality of anodes and a plurality of cathodes arranged in a stack; and a plurality of the catalyzed separators, including a first catalyzed separator and a second catalyzed separator;

wherein the first catalyzed separator is disposed on a first end of the stack and wherein the second catalyzed separator is disposed on a second end of the stack.

11. A catalyzed separator for a battery cell, comprising:

a catalyzed coating arranged on a substrate; and the catalyzed coating including a bimetallic catalyst arranged on a support material including lithium.

12. The catalyzed separator of claim 11, wherein the coating arranged on the substrate has a thickness that is between 300 nanometers and 10 microns.

13. The catalyzed separator of claim 11, wherein the support material comprises one of lithium-zeolite, zeolite, metal-organic framework, alumina (Al2O3), silica (SiO2), titania, boehmite, or magnesium oxide (MgO).

14. The catalyzed separator of claim 11, wherein the substrate of the catalyzed separator is fabricated from one of a polyaramid material, a polyethylene material, or a polypropylene material.

15. The catalyzed separator of claim 11, wherein the bimetallic catalyst includes rhodium and a second transition metal.

16. The catalyzed separator of claim 15, wherein the second transition metal comprises one of nickel, cobalt, manganese, zinc, copper, or iron.

17. The catalyzed separator of claim 15, wherein the bimetallic catalyst is joined to the substrate via ion exchange.

18. The catalyzed separator of claim 11, wherein the bimetallic catalyst includes ruthenium and a second transition metal, and wherein the second transition metal comprises one of nickel, cobalt, manganese, zinc, copper, or iron.

* * * * *